US 6,620,073 B2

(12) United States Patent
Kazaoka et al.

(10) Patent No.: US 6,620,073 B2
(45) Date of Patent: Sep. 16, 2003

(54) DRIVING FORCE TRANSMITTING DEVICE FOR VEHICLE

(75) Inventors: Masumi Kazaoka, Aichi-ken (JP); Toru Kagata, Aichi-ken (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 10/208,770

(22) Filed: Aug. 1, 2002

(65) Prior Publication Data

US 2002/0187874 A1 Dec. 12, 2002

Related U.S. Application Data

(62) Division of application No. 09/617,034, filed on Jul. 14, 2000, now Pat. No. 6,450,915.

(30) Foreign Application Priority Data

Jul. 14, 1999 (JP) ............................ 11-200021
Jul. 13, 2000 (JP) ....................... 2000-212515

(51) Int. Cl.⁷ ................................................ F16H 48/24
(52) U.S. Cl. ............................... 475/231; 180/247
(58) Field of Search .......................... 475/231, 237, 475/243, 245; 180/247, 249, 250

(56) References Cited

U.S. PATENT DOCUMENTS 3,973,450 A    8/1976    Shealy
4,271,722 A    6/1981    Campbell
4,341,281 A    7/1982    Nagy
4,788,888 A    12/1988   Tsutsumikoshi
4,915,190 A    4/1990    Iwata
5,171,192 A    12/1992   Schlosser et al.
5,386,898 A    2/1995    Weilant et al.
5,890,989 A  * 4/1999    Yamazaki et al. .......... 475/295
5,947,859 A    9/1999    McNamara

FOREIGN PATENT DOCUMENTS

EP    0 241 382 A1    10/1987
JP    8-85355 A       4/1996

* cited by examiner

Primary Examiner—Ankur Parekh
(74) Attorney, Agent, or Firm—Burns, Doane, Swecker & Mathis, LLP

(57) ABSTRACT

A driving force transmitting device for a vehicle includes a drive mode-shifting mechanism which is disposed in the final drive gear-set of a vehicle. The drive mode-shifting mechanism includes a first rotating member, a second rotating member, a third rotating member, and a movable member. The movable member is movable between a first position in which the first and second rotating members are disconnected to effect the two-wheel-drive mode, a second position in which the first and second rotating members are connected to effect differential-free four-wheel-drive mode, and a third position in which the second and third rotating members are connected to effect the differential-lock four-wheel-drive mode.

1 Claim, 4 Drawing Sheets

DRIVING FORCE TRANSMITTING DEVICE FOR VEHICLE

This application is a divisional of application Ser. No. 09/617,034, filed on Jul. 14, 2000, now U.S. Pat. No. 6,450,915.

This application is based on and claims priority under 35 U.S.C. §119 with respect to Japanese Application No. 11(1999)-200021 filed on Jul. 14, 1999 and Japanese Application No. 2000-212515 filed on Jul. 13, 2000, the entire content of both of which is incorporated herein by reference.

FIELD OF THE INVENTION

The present invention generally relates to a driving force transmitting device for a vehicle. More particularly, the present invention pertains to a driving force transmitting device including a drive mode-shifting mechanism which shifts the drive mode between a two-wheel drive mode, a differential free four-wheel drive mode, and a differential lock four-wheel drive mode.

BACKGROUND OF THE INVENTION

A conventional driving force transmitting device for a vehicle is disclosed in Japanese Patent Application Laid-Open Publication No. Hei 8 (1996)-85355. This device includes a first sleeve connected to the outer circumference of the right drive shaft and movable axially via a spline engagement, a second sleeve connected to the outer circumference of the first sleeve and axially movable via a spline engagement, a first dog-clutch device formed on the right side gear of the differential gear and the first sleeve to connect and disconnect the right side gear and the first sleeve in response to axial movement of the first sleeve, and a second dog-clutch device formed on the casing of the differential gear and the second sleeve to connect and disconnect the casing and the second sleeve in response to axial movement of the second sleeve. With this device, when the first sleeve is disconnected from the right side gear and the second sleeve is disconnected from the casing, the transmission of the driving force between the right and left drive shafts and the propeller or drive shaft is prohibited, and a two-wheel drive mode is thus established. When the first sleeve is connected to the right side gear and the second sleeve is disconnected from the casing, the transmission of the driving force between the right and left drive shafts and the drive shaft is allowed with functional operation of the differential gear, and so a differential-free four wheel drive mode is established. Further, when the first sleeve is connected to the right side gear and the second sleeve is connected to the casing, the transmission of the driving force between the right and left drive shafts and the drive shaft is allowed while prohibiting the functional operation of the differential gear, and so a differential-lock four wheel drive mode is established.

In the above-described device, however, two sleeves are required for shifting the drive mode between the three drive modes. Namely, the first sleeve shifts the drive mode between the two-wheel drive mode and the differential free four-wheel drive mode, and the second sleeve shifts the drive mode between the differential free four-wheel drive mode and the differential lock four-wheel drive mode under the first sleeve-on condition. Therefore, the number of the component increases and the complexity of the structure of the device is increased.

Further, because two actuators are required for operating the sleeves, the overall size of the system, including the transmitting device and the actuators, is increased and the manufacturing cost of the transmitting device is also increased.

In light of the foregoing, a need exists for a driving force transmitting device that does not suffer from the foregoing disadvantages and drawbacks.

It would thus be desirable to provide a driving force transmitting device for a vehicle which is able to shift the drive mode between three drive modes without increasing the manufacturing cost, the number of components and the complexity of the overall device.

SUMMARY OF THE INVENTION

According to one aspect of the present invention, a driving force transmitting device for a vehicle includes a housing in which are disposed a differential gear connected to a pair of wheels and a drive-mode-shifting mechanism. The drive-mode-shifting mechanism includes a first rotating member forming an output member of the differential gear for one wheel side, a second rotating member rotatable relative to the first rotating member and rotatable together with one of the wheels, a third rotating member rotatable together with a casing of the differential gear to which driving force is transmitted from a power source, and a movable member. The movable member is movable between a first position in which the first and the second rotating members are disconnected to effect the two-wheel-drive mode, a second position in which the first and the second rotating members are connected to effect the differential-free four-wheel-drive mode, and a third position in which the first, the second and the third rotating members are connected to effect the differential-lock four-wheel-drive mode.

When the movable member is positioned to disconnect the connection between the first and the second rotating members (i.e., the two-wheel-drive mode), the casing and the third rotating member rotate together in response to the driving force transmitted from the power source. An output member of the differential gear for another wheel side does not transmit the driving force from the power source to another wheel because the output member of the differential gear for one wheel side is disconnected from one wheel.

When the movable member is positioned to connect the first and second rotating members and disconnect the connection between the first and third rotating members (i.e., the differential-free four-wheel-drive mode), the third rotating member rotates together with the first and second rotating members, and the output member of the differential gear for another wheel side transmits power from the power source. In this mode, the difference in rotational speed between the one wheel and another wheel is absorbed because the first rotating member is connected with the output member of another wheel side through the differential gear. Furthermore, when the movable member connects the first and second rotating members and connects the first and third rotating members (i.e., the differential-lock four-wheel-drive mode), the pair of wheels rotates at the same rotation speed because the first, second and third rotating members are locked, and power is transmitted to the pair of wheels from the power source. Accordingly, it is possible to shift the drive mode between the two-wheel drive mode, the differential-free four-wheel-drive mode and the differential-lock four-wheel drive mode through the operation of the movable member.

According to another aspect of the present invention, a driving force transmitting device for a vehicle includes a housing in which are disposed a differential gear connected to a pair of wheels and a drive-mode-shifting mechanism. The drive-mode-shifting mechanism includes a first rotating member rotatable in response to the driving force transmitted from a power source, a second rotating member rotatable together with a casing of the differential gear, a third rotating member forming an output member for the differential gear and rotatable together with the one wheel, and a movable member shiftable between a first position in which the first and second rotating members are disconnected to effect the two-wheel-drive mode, a second position in which the first and second rotating members are connected to effect differential-free four-wheel-drive mode, and a third position in which the first and third rotating members are connected to effect the differential-lock four-wheel-drive mode.

When the movable member disconnects the connection between the first and second rotating members (i.e., the two-wheel-drive mode), the driving force from the power source is not transmitted to the pair of wheels because the driving force from the power source is not transmitted to the casing of the differential gear. When the movable member connects the first and second rotating members and disconnects the first and third rotating members (i.e., the differential-free four-wheel-drive mode), the driving force from the power source is transmitted to the pair of wheels through the differential gear, because the first rotating member rotates together with the casing through the second rotating member. In this mode, the difference in rotational speed between the one wheel and another wheel is absorbed by the differential gear. Further, when the movable member connects the first and second rotating members and connects the first and third rotating members (i.e., the differential-lock four-wheel-drive mode), the pair of wheels rotates at the same rotation speed because the first, second and third rotating members are locked and power from the power source is transmitted to the pair of wheels. Accordingly, it is possible to shift the drive mode between the two-wheel drive mode, the differential-free four-wheel drive mode and the differential-lock four-wheel drive mode by the operation of movable member.

In the present invention, it is possible to shift between the three drive modes by shifting a single movable member between the first position, the second position and the third position. Accordingly, the drive mode-shifting mechanism can be constructed and controlled in a rather simple manner. Further, it is possible to reduce the manufacturing cost of the drive mode-shifting mechanism.

The differential referenced herein refers to a differential assembly for absorbing the difference in rotational speed between the pair of wheels to permit smooth driving. The differential can be a limited slip differential. The final drive gearset referenced herein refers to the final drive/differential assembly.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
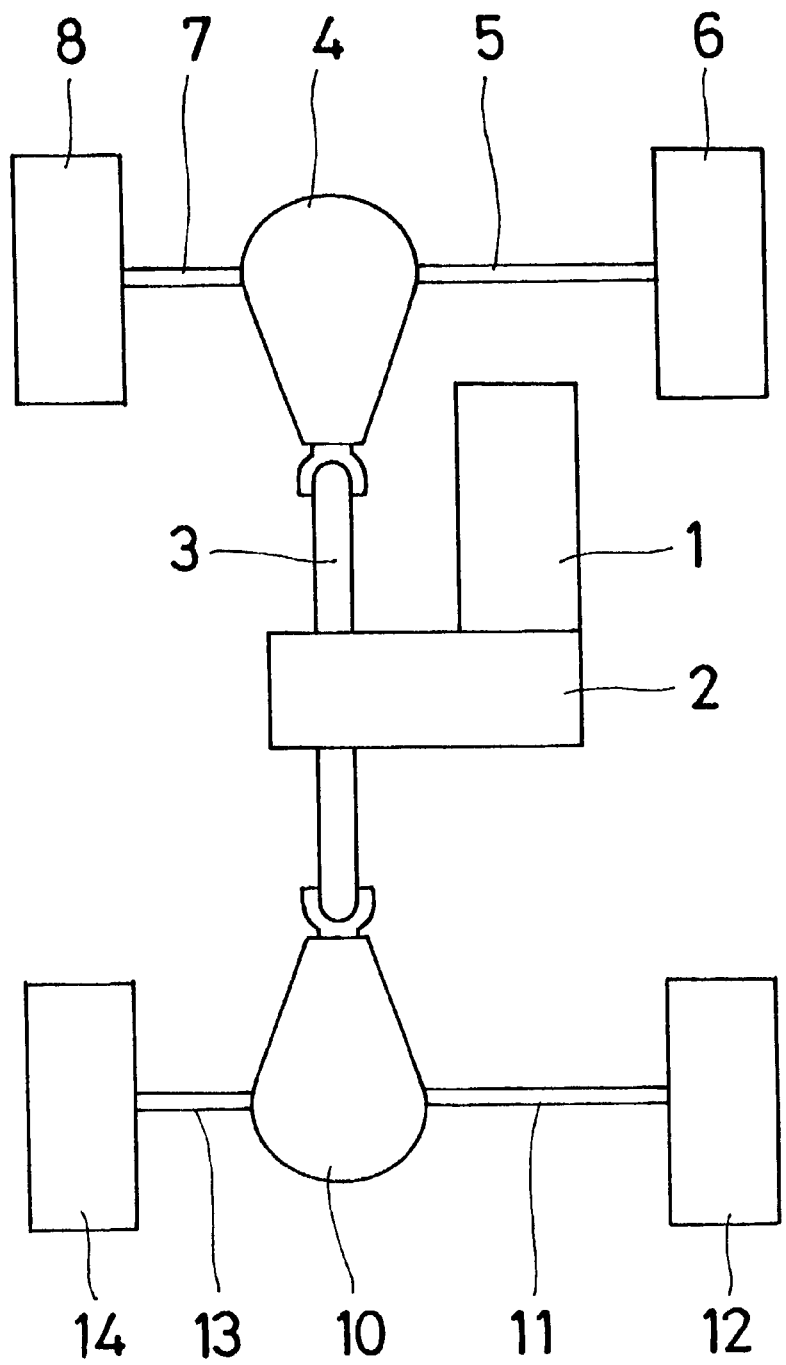
FIG. 1 is a schematic illustration of a portion of a vehicle provided with a driving device that includes a drive mode-shifting mechanism in accordance with the present invention.

A vehicle equipped with a driving force transmitting device in accordance with the present invention is schematically shown in FIG. 1. In the various embodiments of the present invention discussed below, the vehicle is a rear wheel drive vehicle in which engine power is transmitted to the rear wheels at all times. In the two-wheel-drive mode, power transmission to the front wheels is interrupted.

Referring to FIG. 1, the vehicle includes an engine 1 which serving as a power source, a transmission 2 connected to the output of the engine 1, a drive axle 3 having one end connected to the output side of the transmission 2 for transmitting power from the engine 1, and a pair of final drive gear-sets 4, 10 having differential gears inside and each disposed on one end of the drive axle 3. In addition, a pair of front axles 5, 7 is connectable to the output of the differential gear 20 (shown in FIG. 2) in the final gear-set 4 and respective front wheels 6,8 are attached to each of the front axles 5, 7. A pair of rear axles 11, 13 is connected to the output of the differential gear in the final gear-set 10 and a respective rear wheel 12, 13 is attached to each of the rear axles 11, 13.

The driving force inputted from the drive axle 3 to the final gear-set 10 is transmitted to the pair of rear wheels 12, 14 at all times. Driving power inputted from the drive axle 3 to the final gear-set 4 is transmitted to the front wheels 6, 8 by operation of the drive mode-shifting mechanism 50 shown in FIG. 2.

Figure 2:
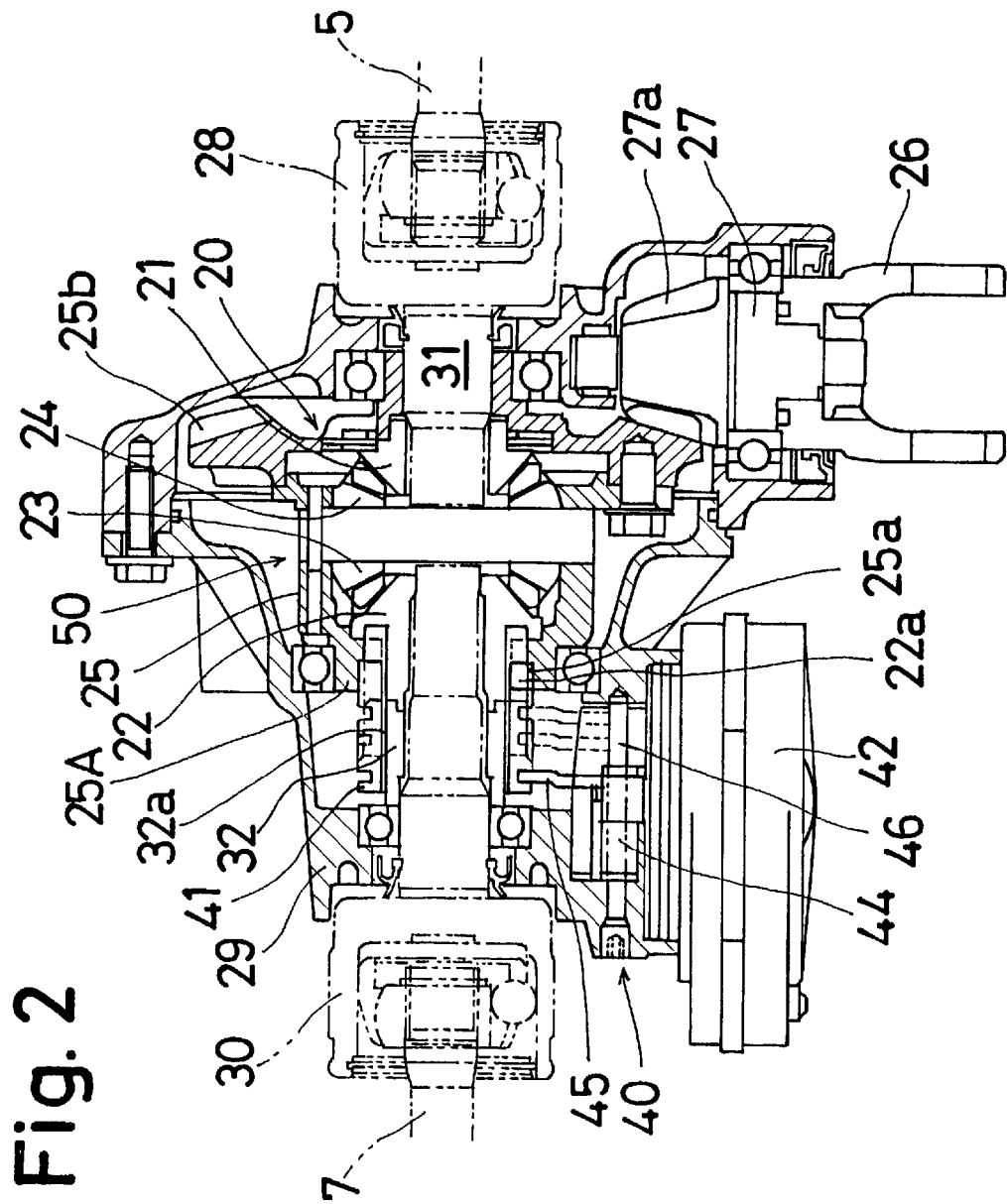
FIG. 2 is a cross-sectional view of the main portions of the drive mode-shifting mechanism according to a first embodiment of the present invention.

Referring to FIG. 2, the differential gear 20 in the final gear-set 4 includes a pair of side gears 21, 22 formed in the same general direction of the front axles 5,7 and each composed of an output portion operatively associated with the respective front axle 5, 7. The differential gear 20 also includes a pair of pinion gears 23, 24 engaging the side gears 21, 22 respectively and formed generally in a direction perpendicular to the front axles 5, 7. The differential gear 20 is housed in a casing 25 for rotation in the same direction as the front axles 5, 7. The casing 25 forms a ring gear 25b engaging a pinion gear 27a formed on the end of an input shaft 27 which transmits the rotation of the drive axle 3 to the casing 25 via a yoke 26. An output shaft 31 which engages the side gear 21 by way of a spline is connected to the front axle 5 via a ball joint 28.

The drive mode-shifting mechanism 50 is formed in the final gear-set 4 and includes a first rotating member constituted by the side gear 22 which is the output to the front wheel 8, a second rotating member 32 rotatable together with the front wheel 8 and located at the axial end of the first rotating member 22 for rotating relative to the first rotating member 22, a third rotating member 25A constituting part of the casing 25 which rotates in accordance with the rotation of the input shaft 27, a sleeve 41 constituting a movable member that is movable between a first position in which the first rotating member 22 and the second rotating member 32 are disconnected to effect the two-wheel-drive mode, a second position for connecting the first rotating member 22 and the second rotating member 32 to effect differential-free four-wheel-drive mode, and a third position for connecting the second rotating member 32 and the third rotating member 25A to effect the differential-lock four-wheel-drive mode, and an actuator 42 for moving the sleeve 41 in the axial direction between the first, second and third positions. The sleeve 41 and the actuator 42 form a shifting device 40. The second rotating member 32 is disposed in a housing 29 at a position adjacent the axial end of the first rotating member 22. The end of the second rotating member 32 is connected with the front axle 7 via a ball joint 30.

The outer surface of the first rotating member 22 is provided with a first spline 22a, the outer surface of the second rotating member 32 is provided with a second spline 32a, and the inner surface of the third rotating member 25A is provided with a third spline 25a. The cross-sectional shape of the first spline 22a and the second spline 32a is substantially same. Further, the third spline 25a opposes the first spline 22a generally in the radial direction. The sleeve 41 possesses a cylindrical hollow shape and is provided with splines on its inner surface and its outer surface which are engageable with the first spline,22a, the second spline 32a and the third spline 25a. In the present invention, the first spline 22a rotates together with the second spline 32a by moving the sleeve 41 in the axial direction.

The actuator 42 which moves the sleeve 41 in the axial direction includes or is operatively associated with an electric motor that rotates according to the supplied current, a reduction gear that reduces the output of the electric motor, an output gear for transmitting the output from the reduction gear via a spiral spring, and a rack 44 transforming the rotation of the output gear into movement in the axial direction. The rack 44 is slidably movable on the outer surface of a shaft 46 which is installed in the housing 29. The operation of the motor is controlled by an electric control unit (ECU). The driving force of the motor is transmitted to the output gear via the reduction gear and the spiral spring, and the rack 44 moves in the axial direction in accordance with the rotation of the output gear. This thus causes a fork member 45 which fixed on the rack 44 to also move in the axial direction. Accordingly, it is possible to engage the sleeve 41 mounted on the end of the fork 45 with each of the splines 22a, 32a, 25a by axially moving the fork 45.

With the vehicle in the two-wheel-drive mode, the sleeve 41 is located at the left end of FIG. 2 shown in solid line Which constitutes the first position. At the first position, the sleeve 41 engages the first rotating member 32 but does not engage the second rotating member 22. Driving torque from the engine 1 is transmitted to the casing 25 from the transmission 2 via the drive axle 3, the yoke 26 and the input shaft 27. However, the first rotating member 22 rotates only itself because the first rotating member 22 is not engaged with the front axle 7. In this Way, the two-wheel-drive mode is performed because the driving force from the drive axle 3 is not transmitted to the front axle 7.

When the vehicle shifts to the differential-free four-wheel-drive mode from the two-wheel-drive mode, the sleeve 41 engages the second spline 32a and the first spline 22a as a result of sliding movement of the sleeve 41 towards the center portion shown in broken line in FIG. 2. This constitutes the second position of the sleeve 41. At the second position, the sleeve 41 does not engage the third spline 25a. It is to be noted that when the phase or rotation of the first spline 22a differs from the phase or rotation of the second spline 32a, the sleeve 41 cannot move to engage with the first spline 22a, and the spiral spring is compressed in spite of driving the motor. When the phase of the first spline 22a moves into harmonization with the phase of the second spline 32a, the sleeve 41 is able to move axially and engage the first spline 22a. Driving torque from the engine 1 is thus transmitted to the casing 25 from the transmission 2 via the drive axle 3, the yoke 26 and the input shaft 27. Further, driving torque from the engine 1 is transmitted to the front wheels 6, 8 from the side gears 21, 22 as output of the differential gear 20 via the transmission 2 and the front axles 5, 7. When the vehicle is turning, rotation differences are generated between the left side front wheel 8 and the right side front wheel 6. However, these rotation differences are absorbed by the rotation of the side gears 21, 22 and the pinion gears 23, 24 themselves and so it is possible to smoothly drive the vehicle.

When the vehicle shifts to the differential-lock four-wheel-drive mode from the differential-free four-wheel-drive mode, the sleeve 41 engages the second spline 32a and the first spline 22a through movement of the sleeve 41 toward the right end in FIG. 2. This position of the sleeve 41 is shown in broken line in FIG. 3 and constitutes the third position of the sleeve 41. At the third position, the spline on the outer surface of the sleeve 41 engages the third spline 25a. The front axles 5, 7 and the casing 25 are thus locked-up and rotate together as a unit. Driving torque from the engine 1 is transmitted to the front wheels 6, 7 from the transmission 2 via the drive axle 3, the yoke 26, the input shaft 27, the casing 25 and the front axles 5, 7. In this condition, the capability for running progresses because the differential gear 20 does not operate and the front wheels 6, 8 rotate together or as a unit if one of the front wheels 6, 8 does not contact the road or travels into a muddy area for example.

According to the first embodiment, when the splined shafts are out of phase with one another, the sliding movement of the sleeve 41 is limited through use of the spiral spring. It is to be understood, however, that the use of the spiral spring is not essential to the present invention. Rather, any type of mechanism may be used as long as the sleeve 41 is inhibited from sliding before the splines are located in phase with one another. Further, it is possible to use a mechanism different from the motor actuator 42. for sliding the sleeve 41, such as one involving a manual lever.

Figure 3:
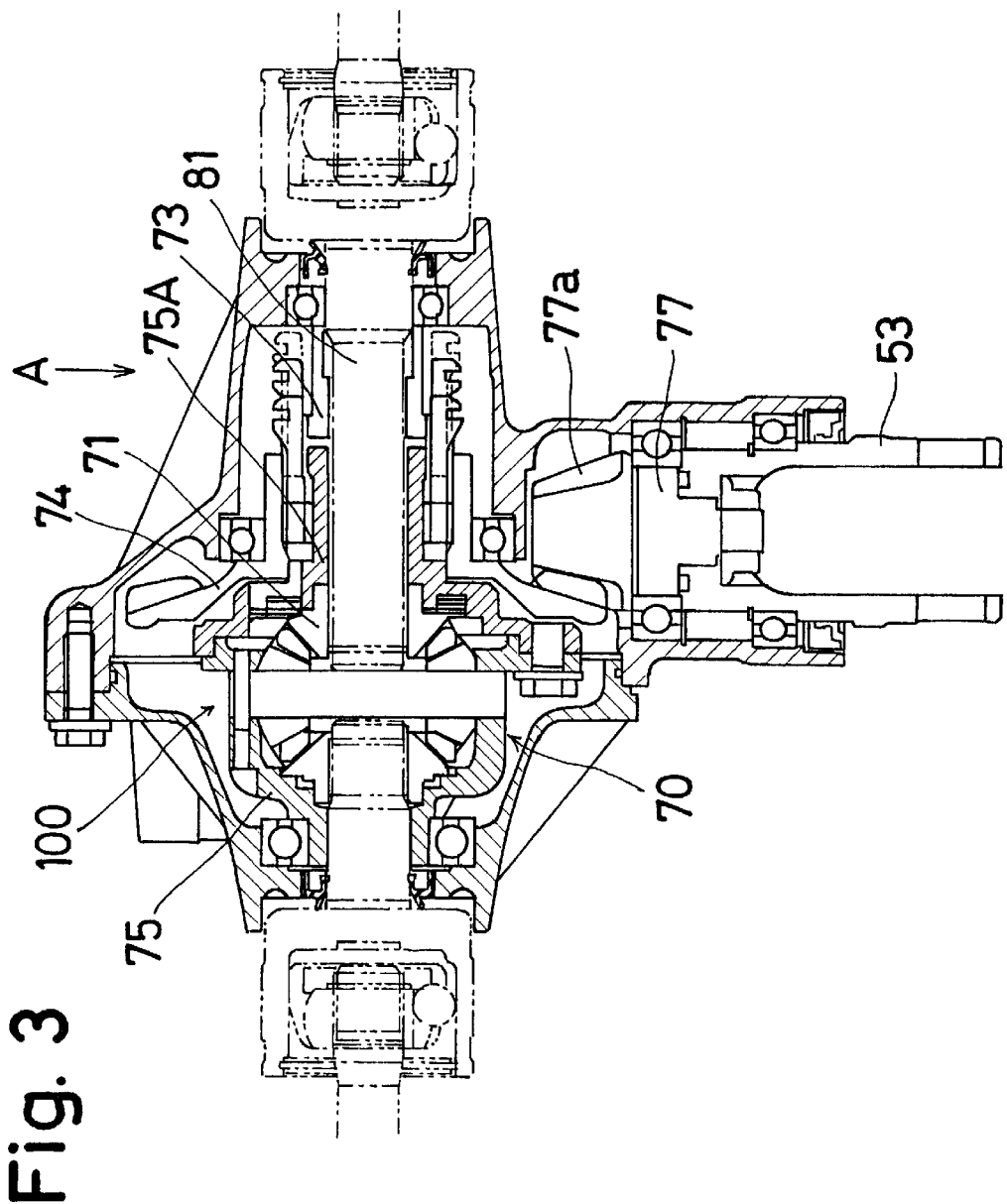
FIG. 3 is a cross-sectional view of the main portions of the drive mode-shifting mechanism according to a second embodiment of the present invention.
Figure 4:
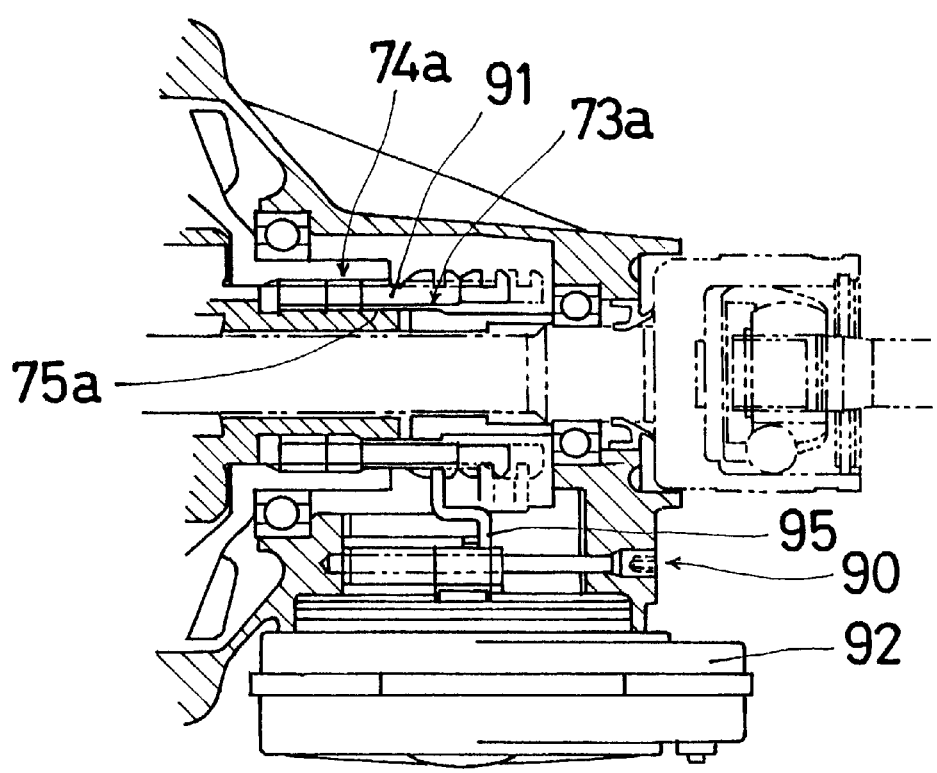
FIG. 4 is a side view of the drive mode-shifting mechanism shown in FIG. 3 as seen from the direction of the arrow A in FIG. 3.

A second embodiment of the present invention is explained below with reference to the illustrations FIGS. 3 and 4. FIG. 3 is a cross-sectional view of the main portions of the drive mode-shifting mechanism 100 according to the second embodiment while FIG. 4 illustrates a shifting device 90 including a movable member 91 of the drive mode-shifting mechanism 100.

As shown in FIG. 3, the drive mode-shifting mechanism 100 includes a first rotating member 74 as a ring gear which rotates in the same direction as the output of a differential gear 70, a second rotating member 75A formed as part of a casing 75 of the differential gear 70 and rotatable relative to the first rotating member 74, a third rotating member 73 which is an output of the differential gear 70, and a sleeve 91 functioning as a movable member. The sleeve or movable member 91 is movable between a first position in which the first and second rotating members 74, 75A are disconnected to effect the two-wheel-drive mode, a second position in which the first and second rotating members 74, 75A are connected to effect the differential-free four-wheel-drive mode, and a third position in which the first and third rotating members 74, 73 are connected to effect the differential-lock four-wheel-drive mode.

The first rotating member 74 is the ring gear engaging a pinion gear 77a of an input shaft 77, with a first spline 74a being formed in the inner surface of the first rotating member 74. The second rotating member 75A is a part of the casing 75, and a second spline 75a is formed on the inner surface of the rotating member 75A in opposing relation to the first spline 74a with respect to the radial direction. The third rotating member 73 is spline engaged with the outer surface of the output shaft 81 which rotates together with the side gear 71 as an output of the differential gear 70. A third spline 73a having the same shape as the second spline 75a is formed on the outer surface of the third rotating member 73. An actuator 92 is operatively associated with the sleeve 91 to move the sleeve 91 in the axial direction. The shifting device 90 is comprised of the sleeve 91 and the actuator 92.

The sleeve 91 is formed as a generally cylindrical hollow-shaped element with splines formed on its outer and inner surface to engage the splines 74a, 75a, 73a. The sleeve 91 slides along the axial direction of the first, second and third rotating members 74, 75, 73. The structure and operation of the actuator 92 is the same as that described above in connection with the first embodiment and so a detailed description is not repeated here.

When the vehicle is in the two-wheel-drive mode, the sleeve 41 is located at the left end of FIGS. 3 and 4 and is shown in solid lines. In this first position of the sleeve 91, the spline on the inner surface of the sleeve 91 does not engage the second spline 75a. Accordingly, rotation of the ring gear (the first rotating member) 75b is not transmitted and so while the rear wheels are driven, the front wheels are not so that they simply rotate following the rear wheels.

When the vehicle shifts to the differential-free four-wheel-drive mode from the two-wheel-drive mode, the sleeve 91 slides toward the center portion in FIGS. 3 and 4 by operation of the actuator 92 by way of the fork 95. At this center position constituting the second position, the spline on the outer surface of the sleeve 91 engages the first spline 74a and the spline on the inner surface of the sleeve 91 engages the second spline 75a. Therefore, the casing 25 rotates by virtue of the transmission of the rotation of the drive axle to the casing 25 via the ring gear 75b. The driving force is thus transmitted to the front wheels upon becoming shifted to the differential-free four-wheel-drive mode from the two-wheel-drive mode, and the differential gear 70 is rendered operational.

When the vehicle shifts to the differential-lock four-wheel-drive mode from the differential-free four-wheel-drive mode, the sleeve 91 is moved to the right end from the center portion in FIGS. 3 and 4 through operation of the actuator 92 by way of the fork 95. In this third position of the sleeve 91, the spline on the outer surface of the sleeve 91 engages the first spline 74a and the spline on the inner surface of the sleeve 91 engages the second spline 75a and the third spline 73a. In this condition, the ring gear 75b, the casing 75 and one of the side gear 71 of the differential gear 70 are locked up and rotate as a unit. The device is thus shifted to the differential-lock four-wheel-drive mode from the differential-free four-wheel-drive mode in which the differential gear 70 is not operational.

The second embodiment of the present invention is advantageous in that the power loss can be lessened as compared to the vehicle described in the first embodiment because the rotation of the drive axle is not transmitted to the casing 75 during the two-wheel-drive mode.

In accordance with the present invention, it is possible to shift between three drive modes by moving the one movable member between the first position, the second position and the third position. Accordingly, the drive mode-shifting mechanism can be constructed and controlled in a relatively simple manner. Further, it is possible to prevent an increase in the cost of the drive mode-shifting mechanism.

In the first and second embodiments of the present invention, it is also possible to shorten the length of the differential with respect to the width direction of the vehicle because the first spline is formed so as to oppose the third spline with respect to the radial direction. That is, the first rotating member is disposed around the third rotating member so as to overlap with respect to the axial direction.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. For example, it is possible to connect each rotating member by using a dog clutch instead of the spline.

What is claimed is:

1. A driving force transmitting device for vehicle comprising:
    a housing in which are disposed a differential gear connected to a pair of wheels and a drive-mode-shifting mechanism, the drive-mode-shifting mechanism including a first rotating member rotatable in response to a driving force transmitted from a power source, a second rotating member rotatable together with a casing of the differential gear, a third rotating member forming an output member for the differential gear and rotatable together with one wheel, where the first, the second and the third rotating members are disposed coaxially, the first rotating member having a surface provided with a first spline, the second rotating member having a surface provided with a second spline, the third rotating member having a surface provideed with a third spline, and a movable member shiftable between a first position in which the first and second rotating members are disconnected to effect a two-wheel-drive mode, a second position in which the first and second rotating members are connected to effect a differential-free four-wheel-drive mode, and a third position in which the first and third rotating members are connected to effect a differential-lock four-wheel-drive mode, the movable member being movable in an axial direction of the first, the second and the third rotating members wherein the first spline is provided on an inner surface of the first rotating member, the second spline is provided on an outer surface of the second rotating member, the third spline is provided on an outer surface of the third rotating member, the second spline possesses a cross-sectional shape that is the same as the cross-sectional shape of the third spline, and the first spline is disposed on an outer circumference of the second spline.

* * * * *